(12) United States Patent
Zuo et al.

(10) Patent No.: US 10,019,193 B2
(45) Date of Patent: Jul. 10, 2018

(54) CHECKPOINTING A JOURNAL BY VIRTUALIZATION OF NON-VOLATILE RANDOM ACCESS MEMORY

(71) Applicant: HEWLETT PACKARD ENTERPRISE DEVELOPMENT LP, Houston, TX (US)

(72) Inventors: Xiaoshan Zuo, San Jose, CA (US); Tomasz Barszczak, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/932,356

(22) Filed: Nov. 4, 2015

(65) Prior Publication Data
US 2017/0123685 A1 May 4, 2017

(51) Int. Cl.
*G06F 3/06* (2006.01)

(52) U.S. Cl.
CPC .............. *G06F 3/065* (2013.01); *G06F 3/061* (2013.01); *G06F 3/0619* (2013.01);
(Continued)

(58) Field of Classification Search
CPC ...... G06F 3/0611; G06F 3/065; G06F 3/0683; G06F 3/0632; G06F 3/0664; G06F 3/0665; G06F 3/0688; G06F 2003/0694; G06F 11/1407; G06F 11/1435; G06F 11/1446; G06F 2212/1024; G06F 2212/152; G06F 2212/202; G06F 2212/2515; G06F 17/30191; G06F 2201/855; G06F 3/0649;
(Continued)

(56) References Cited

U.S. PATENT DOCUMENTS 4,823,261 A * 4/1989 Bank ......................... G06F 9/52
700/5
4,941,087 A * 7/1990 Kap ...................... G06F 9/4812
700/82

(Continued)

OTHER PUBLICATIONS

Rumble et al., "Log-structured Memory for DRAM-based Storage," Feb. 17-20, 2014, 12th USENIX Conference on File and Storage Technologies (FAST '14), 17 pages. <http://www.scs.stanford.edu/~rumble/papers/fast14-paper_rumble.pdf>.

(Continued)

*Primary Examiner* — Mano Padmanabhan
*Assistant Examiner* — Andrew J Cheong

(57) ABSTRACT

Methods, systems, and computer programs are presented for virtualizing Non-Volatile Random Access Memory (NVRAM). A first area in RAM is labeled as active area and a second area as non-active area, and an active journal and a non-active journal are created in permanent storage. A transaction is created for each write made to the virtual NVRAM, and the created transactions are written to the active journal and to the active area. When the active journal is greater than a predetermined size or a timeout occurs, a checkpoint is created by copying contents from the active area to the non-active area, switching status of the active area and the non-active areas (the active area becomes the non-active area and the non-active area becomes the active area), switching status of the active journal and the non-active journal, and copying the content of the current non-active area to permanent storage.

20 Claims, 11 Drawing Sheets

(52) U.S. Cl.
CPC .......... *G06F 3/0635* (2013.01); *G06F 3/0664* (2013.01); *G06F 3/0673* (2013.01)

(58) Field of Classification Search
CPC . G06F 12/0638; G06F 12/0873; G06F 12/127
See application file for complete search history.

(56) References Cited

U.S. PATENT DOCUMENTS

| | | | | |
|---|---|---|---|---|
| 5,202,994 | A * | 4/1993 | Begur | G06F 12/0638 711/202 |
| 5,574,874 | A * | 11/1996 | Jones | G06F 11/1407 711/100 |
| 6,553,509 | B1 | 4/2003 | Hanson et al. | |
| 6,567,889 | B1 * | 5/2003 | DeKoning | G06F 3/0601 711/113 |
| 6,732,124 | B1 | 5/2004 | Koseki et al. | |
| 7,360,118 | B1 * | 4/2008 | Fesler | G06F 11/1658 714/36 |
| 8,621,275 | B1 * | 12/2013 | Havemose | G06F 11/1448 714/13 |
| 8,909,902 | B2 * | 12/2014 | Latorre | G06F 9/3842 712/205 |
| 9,336,229 | B2 * | 5/2016 | Picken | G06F 17/30115 |
| 2005/0015416 | A1 * | 1/2005 | Yamagami | G06F 11/1471 |
| 2005/0080762 | A1 * | 4/2005 | Nakashima | G06F 11/1435 |
| 2005/0223180 | A1 * | 10/2005 | Derbeko | G06F 3/0611 711/162 |
| 2006/0101085 | A1 * | 5/2006 | Soulier | G06F 17/30191 |
| 2006/0227585 | A1 * | 10/2006 | Tomoda | G06F 11/1471 365/36 |
| 2007/0106855 | A1 * | 5/2007 | Hosouchi | G06F 11/2064 711/162 |
| 2007/0112883 | A1 * | 5/2007 | Asano | G06F 11/1469 |
| 2010/0077164 | A1 * | 3/2010 | Stiffler | G06F 11/1438 711/162 |
| 2014/0172803 | A1 * | 6/2014 | Diaconu | G06F 17/30088 707/649 |
| 2015/0193464 | A1 * | 7/2015 | Kwon | G06F 17/30191 707/648 |
| 2015/0205616 | A1 * | 7/2015 | Thai | G06F 9/463 345/542 |
| 2016/0098351 | A1 * | 4/2016 | Bahn | G06F 12/0246 711/144 |
| 2017/0161191 | A1 * | 6/2017 | Cohen | G06F 12/0815 |

OTHER PUBLICATIONS

Shahbaz, "Swapping buffers in single-writer-multiple-reader threads," Oct. 18, 2011, (web page), 6 pages. <https://web.archive.org/web/20131201072935/https://stackoverflow.com/questions/7805957/swapping-buffers-in-single-writer-multiple-reader-threads>.

* cited by examiner

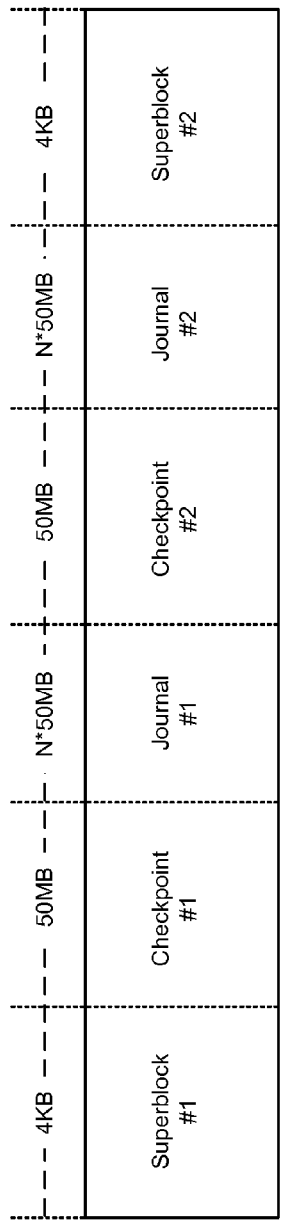
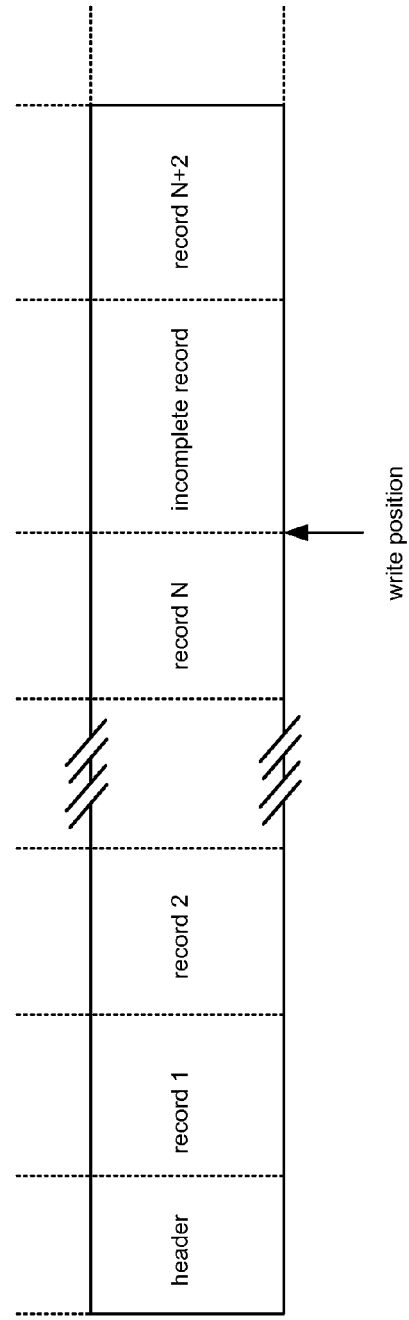
Fig. 3A
Fig. 3B

CHECKPOINTING A JOURNAL BY VIRTUALIZATION OF NON-VOLATILE RANDOM ACCESS MEMORY

BACKGROUND

1. Field of the Invention

The present embodiments relate to methods, systems, and programs for virtualizing Non-Volatile Random Access Memory (NVRAM).

2. Description of the Related Art

Non-Volatile Random Access Memory (NVRAM) is memory that can retrieve stored information even after having been power-cycled. Some NVRAMs include regular volatile RAM memories that are connected to a power supply independent from the computer's power supply, such that the content of the RAM is not lost when the computer device with the RAM is powered off.

Virtualization refers to the act of creating a virtual (rather than actual) version of something, including a virtual computer hardware platform, operating system, storage device, or computer network resources. However, virtualizing NVRAM without actually using NVRAM memory is a challenging task due to the non-volatile nature of the NVRAM.

For example, if NVRAM is virtualized using RAM memory, when the computer device is powered off, the RAM memory will lose its contents, which would be contrary to the nature of NVRAM. If NVRAM is virtualized by creating an area in permanent disk, the contents would not be lost during a power cycle. However, the speed of access to the memory would be too slow, rendering the system using the virtual NVRAM almost useless, at least performance wise.

What is needed is a virtual NVRAM, implemented without the use of an actual NVRAM memory, that performs like an NVRAM (e.g., speed of access) and that can also retain its contents during a power cycle.

It is in this context that embodiments arise.

SUMMARY

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions. One general aspect includes a method for virtualizing non-volatile random access memory (NVRAM), the method including labeling a first area in random access memory (RAM) as active area and a second area in RAM as non-active area, and creating, in permanent storage, an active journal and a non-active journal. The method also includes creating a transaction for each write made to the virtual NVRAM, and writing the created transactions to the active journal and to the active area. When the active journal is substantially full, a checkpoint is created, where creating the checkpoint includes copying contents from the active area to the non-active area, switching status of the active area and the non-active areas (the active area becomes the non-active area and the non-active area becomes the active area), switching status of the active journal and the non-active journal, and copying contents of the current non-active area to permanent storage.

Implementations may include one or more of the following features. The method as recited where writing the transactions to the active journal and to the active area includes storing a plurality of transactions into a record, writing the record into the active journal kept, and updating contents of the active area based on the record written to the active journal. The method as recited where creating the checkpoint further includes, before copying contents from the active area, blocking new writes to the NVRAM, and after switching status of the active journal and the non-active journal, unblocking the new writes to the NVRAM, and terminating the current non-active journal. The method as recited where switching status of the active journal and the non-active journal further includes initializing the current active journal. The method as recited where a first superblock in permanent storage keeps information on the active journal. The method as recited further including, after a warm recovery of a system hosting the virtual NVRAM, reading the first superblock to identify active area and non-active area, writing the active area to a non-active checkpoint on permanent storage, and switching active and non-active checkpoints on permanent storage. The method as recited further including, after a cold recovery of a system hosting the virtual NVRAM, reading the first superblock to identify active area and non-active area, loading a valid checkpoint into active area, replaying records on the active journal to be loaded into the active area, and saving non-active area to a non-active checkpoint on permanent storage.

One general aspect includes a system for virtualizing non-volatile random access memory (NVRAM), the system including a processor, a random access memory (RAM), and permanent storage. The processor labels a first area in RAM as active area and a second area in RAM as non-active area, and the permanent storage stores an active journal and a non-active journal, where the processor creates a transaction for each write made to the virtual NVRAM and the processor writes the created transactions to the active journal and to the active area. Further, when the active journal is substantially full, the processor creates a checkpoint in the permanent storage. Creating a checkpoint includes copying contents from the active area to the non-active area, switching status of the active area and the non-active areas (the active area becomes the non-active area and the non-active area becomes the active area), switching status of the active journal and the non-active journal, and copying contents of the current non-active area to permanent storage.

One general aspect includes a non-transitory computer-readable storage medium storing a computer program for virtualizing non-volatile random access memory (NVRAM), the computer-readable storage medium including program instructions for labeling a first area in random access memory (ram) as active area and a second area in RAM as non-active area, and for creating, in permanent storage, an active journal and a non-active journal. The storage medium also includes program instructions for creating a transaction for each write made to the virtual NVRAM, and for writing the created transactions to the active journal and to the active area. The storage medium further includes program instructions for, when the active journal is greater than a predetermined size or a timeout occurs, creating a checkpoint. Creating a checkpoint includes copying contents from the active area to the non-active area, switching status of the active area and the non-active areas (the active area becomes the non-active area and the non-active area becomes the active area), switching status of the active journal and the non-active journal, and copying contents of the current non-active area to permanent storage.

BRIEF DESCRIPTION OF THE DRAWINGS

The embodiments may best be understood by reference to the following description taken in conjunction with the accompanying drawings.

FIG. 3A illustrates a high level representation of the format of the journal, according to one embodiment.

FIG. 3B illustrates the process for writing the journal, according to one embodiment.

DETAILED DESCRIPTION

The following embodiments describe methods, devices, systems, and computer programs for virtualizing Non-Volatile Random Access Memory (NVRAM). It will be apparent, that the present embodiments may be practiced without some or all of these specific details. In other instances, well-known process operations have not been described in detail in order not to unnecessarily obscure the present embodiments.

The NVRAM virtualization utilizes system RAM to define two areas of memory for the virtualized NVRAM, referred to as shadow NVRAM #1 and shadow NVRAM #2, where at any given time one of the shadow NVRAMs is active and the other one is non-active, but the status of which NVRAM is active may change over time. Data for the NVRAM is written to the active shadow NVRAMs and a journal is kept on disk of the transactions related to the virtualized NVRAM. These transactions can be batched to be processed together while being saved to disk.

The batched transactions are written to records in the journal. Once a journal is substantially full (i.e., the journal is completely full or is full beyond a predetermined size threshold), and before the next record is written, the contents of the active NVRAM are copied to the non-active NVRAM, which is also referred to as the passive NVRAM. During the copy to the non-active shadow NVRAM, writes to the virtual NVRAM are temporarily blocked. At this point, the shadow NVRAMs trade their active/non-active status, and new transactions go to the newly appointed active shadow NVRAM.

The content of the previously-active NVRAM is then written to permanent storage and a checkpoint is created. This allows for recovery if the system is power cycled without saving the contents of the NVRAM to disk.

If the disk or the system crash, then the content of the latest checkpointed NVRAM is written to the shadow NVRAM that was active, and to complete the missing data, a replay of the written contents in the active journal are also written back to the NVRAM.

Having virtualized NVRAM is useful in many scenarios, such as when a system that has NVRAM is tested, but the test system does not have NVRAM, or the test system doesn't have enough NVRAM to simulate the desired amount of virtualized NVRAM.

Figure 1A:
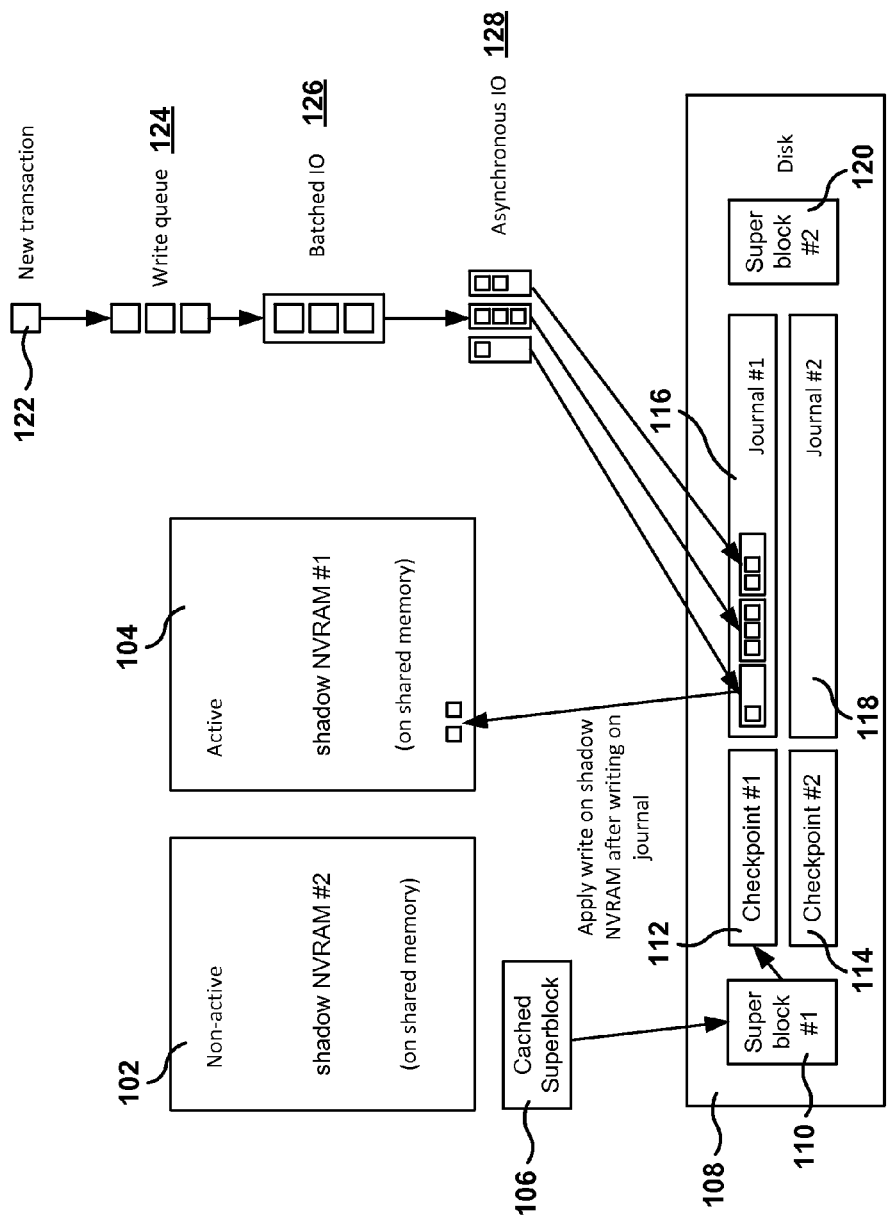
FIG. 1A illustrates a system for virtualizing Non-Volatile Random Access Memory (NVRAM), according to one embodiment.

FIG. 1A illustrates a system for virtualizing Non-Volatile Random Access Memory (NVRAM), according to one embodiment. To support virtualized NVRAM, a journaling system is utilized to keep track of NVRAM transactions. The virtual NVRAM is implemented utilizing two areas of memory, which are referred to as shadow NVRAM #1 104 and shadow NVRAM #2 102. At any time, one of the shadow NVRAMs is labeled as active and the other one is labeled as non-active. The status may change over time, but at any point in time, one will be active and the other will be non-active, except for a small period during status change. The active shadow NVRAM is the memory that has the content of the virtual NVRAM, and new writes to the NVRAM are written to the journal and to the active shadow NVRAM.

There are three main operations related to virtualizing NVRAM:

1. Saving write transactions 122 to disk. It is noted that a transaction write should be batched 126 whenever possible, as discussed in more detail below. Batched IOs are written asynchronously 128 to the journal.

2. Setting checkpoints in disk and switching journals. As a journal becomes full, a checkpoint is made in disk, and the active and non-active checkpoints of the journal are switched. A new journal is then initialized.

3. Recovering from disk or system restart. After a system restart, the data is recovered from both NVRAM checkpoints and/or the journals on disk. After the recovery from disk, a copy of the latest NVRAM checkpoint is saved on disk.

The on-disk 108 data structures include two super blocks 110 and 120, two checkpoints 112 and 114, and two journals 116 and 118. Each superblock include information about the current checkpoint, and each checkpoint includes information about the latest version of the NVRAM saved on disk. The journals keep NVRAM transactions that have occurred since the last checkpoint was made.

Each shadow NVRAM has a corresponding persistent copy of transactions saved on disk, referred to as journal #1 and journal #2 respectively, although the copies may not be exact replicas until all transactions of the journal are reflected in the content of the corresponding shadow NVRAM. When journal #1 116 is the active journal and becomes full or almost full, a checkpoint is taken, journal #1 is closed, and journal #2 118 is started. In one embodiment, the journal is considered substantially full when the size of the journal exceeds a predetermined threshold. Thus, journal #1 becomes the non-active journal, and journal #2 becomes the active journal.

In one embodiment, asynchronous IOs (AIO) 128 are used to process writes to the virtual NVRAM. Further, multiple NVRAM write transactions are batched together 126 into one big write to disk. Since new writes are appended to the journal, substantially all writes are sequential, making the writes to disk fast and able to simulate the quick response of an NVRAM.

In one embodiment, a dedicated disk is used for journaling NVRAM writes. Furthermore, some hypervisors, such as ESX, support rate limits on virtual disks. This feature may be used to guarantee that there are enough IOPS reserved for journaling.

There are a few factors to be considered when sizing the shadow NVRAM and the journal. First, shadow NVRAM consumes main memory, and since the NVRAM library has two copies of shadow NVRAM in memory, the size of the shadow NVRAM should be as small as possible or practical. In some tests, 64 MB of shadow NVRAM was sufficient, but other sizes are also possible (e.g., in the range from 4 MB to 1 GB or more, depending on the system).

Second, the NVRAM library needs to write the shadow NVRAM to disk, and to reduce the frequency of writing to disk (which reduces the ratio of journaling overhead), the journal should be larger than the shadow NVRAM. Since the journal is read into main memory during recovery (as discussed in more detail below with reference to FIG. 1B), the size of the journal is limited, in one embodiment, by the desired recovery-time upper limit.

To reduce the recovery time, shadow NVRAM is allocated in shared memory. During recovery, the NVRAM copy in shared memory is saved and used, and the NVRAM journaling can be restarted.

To the system hosting the NVRAM, the virtual NVRAM appears as real NVRAM, although it is virtualized. Although some embodiments presented herein refer to a network storage device, virtualizing NVRAM may be utilized in any system that utilizes NVRAM. In some cases, the reason for having NVRAM is to respond as fast as possible when writes come in order to give a quick acknowledgement to the initiator. If the system were to wait actually for the data to arrive on disk, it would take too long and the performance of the virtualized NVRAM would not be satisfactory for most systems.

Instead, the data is written to RAM memory and to the journal, and then the system can respond that the write is safely stored. The writes are written to the journal in the form of batched transactions, and eventually (or periodically) the journal is written to disk.

Having checkpoints prevents the journal from becoming too large. When the journal grows to a certain predetermined size (or a timeout occurs), the current checkpoint is transferred to disk and a new checkpoint is started. After recording a write in the journal (referred to as a transaction), an acknowledgment is sent back to the initiator. The transactions accumulate in the journal, and when the journal is full or almost full, the checkpoint is written to disk.

In one embodiment, each record from the journal includes a plurality of transactions. After the journal is closed, incoming writes are blocked temporarily, and a copy of the active shadow NVRAM is transferred to the non-active shadow NVRAM. Then, the roles of the shadow NVRAMs are reversed, where the active shadow NVRAM becomes the non-active shadow NVRAM, and the non-active shadow NVRAM becomes the active shadow NVRAM. Later, the writes to NVRAM are unblocked and new writes are written to the new active shadow NVRAM.

It is noted that in some embodiments, the status of the active and non-active NVRAMs are switched over time, but in other embodiments, the status could always remain the same, having one shadow NVRAM always be the active NVRAM and having a second NVRAM always be the non-active NVRAM.

In addition, when a checkpoint is created, the state of the NVRAM is switched (e.g., active becomes non-active) and the contents of the shadow non-active NVRAM are stored in disk 110. The journals also switch status.

After the status switch, new transactions are stored in the next journal (e.g., journal #2 118). After the save is completed, journal #1 116 is not needed anymore, and it can be freed, so in the future the non-active shadow NVRAM can become again the active shadow NVRAM.

The superblocks (110, 120) have information about what persistent copy of the NVRAM and what journal are to be used during recovery. If there is a system failure, a copy of the persistent NVRAM is taken from a checkpoint, and then the transactions in the journal that reflect what happened after the copy was made are applied to the contents of the persistent NVRAM.

During the initialization of the NVRAM at system start time, a check is made to see if NVRAM data needs to be restored. If there is no data to be restored, the contents of the shadow NVRAMs are reset and all the NVRAM data on the disk is invalidated. One of the shadow NVRAMs is marked as active and the other one is marked as non-active.

If there is NVRAM data that needs to be restored, first, the system finds the copy of the persistent on-disk NVRAM with valid data, and the system loads it into the corresponding shadow NVRAM, and marks the shadow NVRAM as active. Then, the NVRAM journal that has valid data is identified, and the writes in the journal are applied to the active shadow NVRAM. The copy loaded into memory needs to be preserved so the recovery can be repeated if necessary. Once the copy completes, both NVRAM journals are reset on disk.

After the initialization, new writes are written to the active shadow NVRAM and to its journal. In one embodiment, the completion status is not returned to the user until the transaction is persistent on disk.

In one embodiment, the number of IOs written to disk can be reduced by batching the IOs. Batching IOs can also help increase journal utilization. When the number of pending IOs is less than a predetermined threshold, IOs are written to disk immediately. This may result in low utilization of the journal, but it helps reduce latency.

Further, when the number of concurrent writes to the SSD is less than the queue depth, a transaction 122 is submitted as a separate write to the SSD. Otherwise, the transaction 122 is queued in an available write slot in write queue 124. Afterwards, when a write slot is available, a plurality of transactions, up to a certain maximum number (e.g., 128), from the write queues are merged into one large chunk.

The chunk is then written to disk. After the IO to disk completes, the data from the chunk is applied to the active shadow NVRAM in memory. After that, the transaction is marked as completed in the NVRAM library.

In one embodiment, there are two data structures defined in shared memory, and there are two offsets residing on shared memory for each copy of the journal, respectively. One is write_offset, which identifies the next available position where new batched writes can be appended. The other one is complete_offset, which identifies all the previously batched writes. Typically, write_offset>=complete_offset. It can be "greater than" when some batches haven't finished due to pending asynchronous IOs.

There is a cached super block 106 in shared memory as a cache to the super block on disk. Unless specified, each metadata change is firstly recorded on the cached super block 106, then written to the on-disk super block (110 or 120), only after all operations are complete. The cached super block 106 is then checksummed. The on-disk super block will be loaded to the in-memory copy whenever the check fails.

In summary, the work flow of an NVRAM write operation is as follows:

1. When a new transaction comes to active shadow NVRAM, the new transaction is put onto a write queue 124.

2. When the number of pending IOs is less than the threshold, the journal write_offset on is modified, then an asynchronous IO is generated for the batched IO to write on to the active journal (e.g., journal #1 116). If the number of pending IOs exceeds the threshold, IOs are batched later when a write slot becomes available.

3. Once a batched IO completes its writing on the journal, all transactions within the batch are written on the active shadow NVRAM (e.g., active shadow NVRAM #1 104).

4. Once the writing to the active shadow NVRAM completes, the batch IO checks if all previous batch IOs have completed. If completed, the batch IO will scan the pending batch IO queue, wake up all the batch IOs having completed. Otherwise, the batch IO will be suspended and wait for the previous IO to be activated.

It is noted that the embodiments illustrated in FIG. 1A are exemplary. Other embodiments may utilize different data structures, or store the data in different disks, or different RAM areas, etc. The embodiments illustrated in FIG. 1A should therefore not be interpreted to be exclusive or limiting, but rather exemplary or illustrative.

Figure 1B:
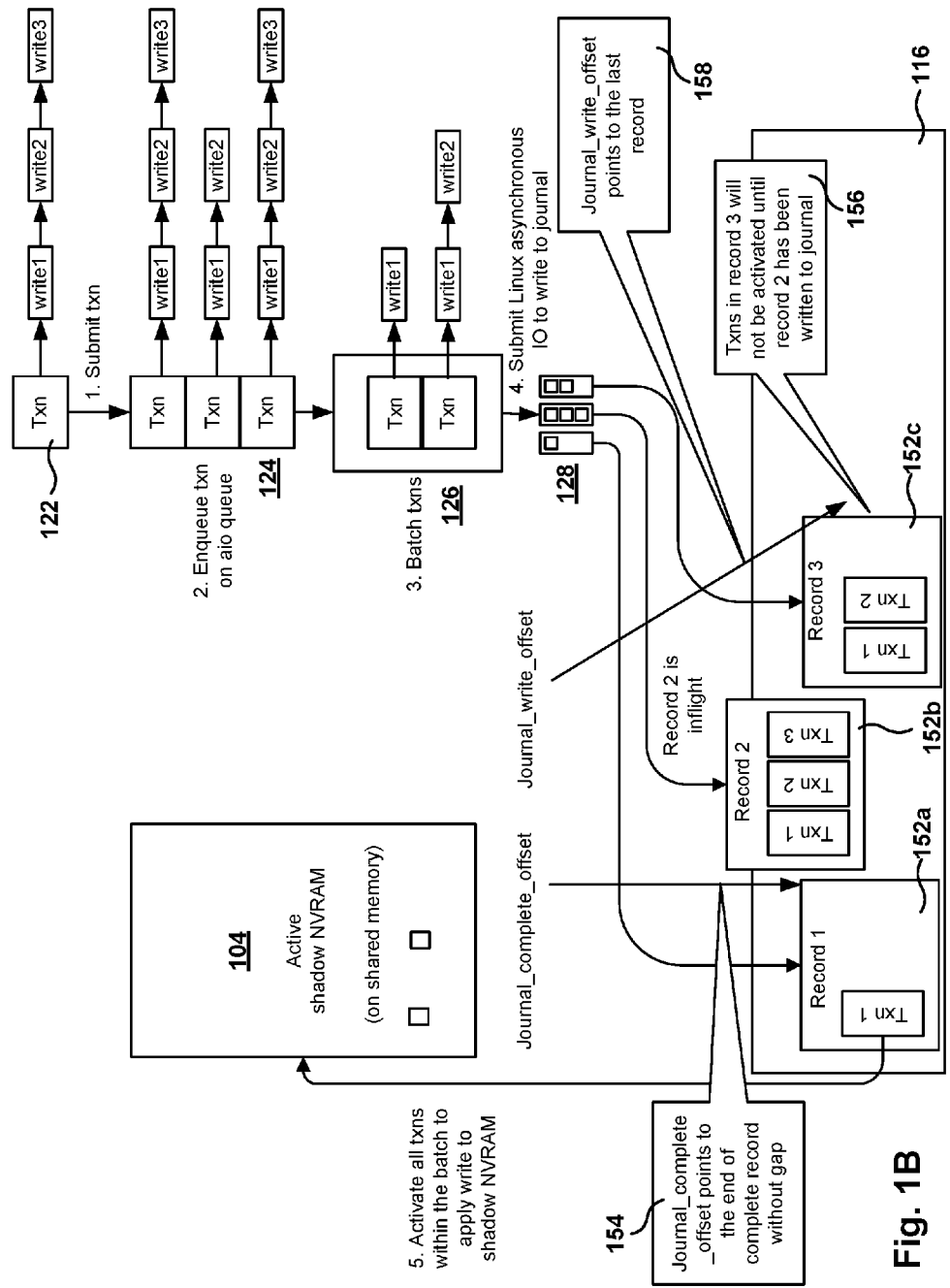
FIG. 1B illustrates the work flow for processing NVRAM write operations, according to one embodiment.

FIG. 1B illustrates the work flow for processing NVRAM write operations, according to one embodiment. Once a write to the NVRAM is considered as safe, the write has to survive any type of failure in the system due to the nature of the NVRAM. During recovery, the writes that have been labeled safe must be recovered.

During recovery, the superblock is read and a determination is made of which persistent copy of NVRAM will be used for the recovery. Then, the persistent copy is written to the shadow NVRAM #1 104, which becomes the active shadow NVRAM. Afterwards, the records in the journal are read and applied to the NVRAM copy in the active shadow NVRAM #1 104.

As discussed earlier, the journal 116 is stored in permanent storage, so the journal can survive a potential system crash or failure. After the journal is applied, the active shadow NVRAM 104 includes all the transactions committed (e.g., acknowledged or labeled as safe) before the crash.

The work flow of an NVRAM write operation is illustrated in FIG. 1B, and includes the following operations:

1. When a new transaction 122 is received, the transaction is appended to a transaction write queue 124.

2. If the number of concurrent AIOs has not exceeded the limit of maximum concurrent AIOs (e.g., the queue depth), a separate AIO is created for writing this transaction to the active journal. If the queue depth has reached the limit, the transaction stays on the queue until a slot becomes available. This can reduce IO latency when the number of concurrent IOs is low, and at the same time, it can handle a large number of concurrent IOs efficiently.

3. When a write slot becomes available, a batched AIO 126 is created to merge one or more transactions from the write queue into a single write. The journal write_offset on memory is modified to reflect the size of the new write request, then the batched IO is written to the active journal 116.

4. Once a batched IO completes, the record (152*a*, 152*b*, 152*c*) is written into the journal, and all transactions within the batch are applied to the active shadow NVRAM 104.

5. Once the transactions are applied to the active shadow NVRAM 104, a check is made to determine if all the previous batched IOs have completed. If they have been completed, the batched IO process will scan the pending batch IO queue and wake up all the batch IOs that have completed. Otherwise, the batch IO process is suspended to wait for activation by completion of the previous IO. It is important to complete the IOs in order because, in one embodiment, during recovery the transactions after the first gap are discarded.

Journal 116 includes a plurality of records (152*a*, 152*b*, 152*c*). The pointer journal_complete offset points 154 to the end of the complete records without a gap. FIG. 1B illustrates Record 2 152*b* which is inflight, and Record 3 that is already in the journal. Journal_write_offset points 158 to the last record (Record 3 152*c*). Further, transactions in Record 3 152*c* will not be activated until Record 2 152*b* has been written to journal 156.

Figure 2:
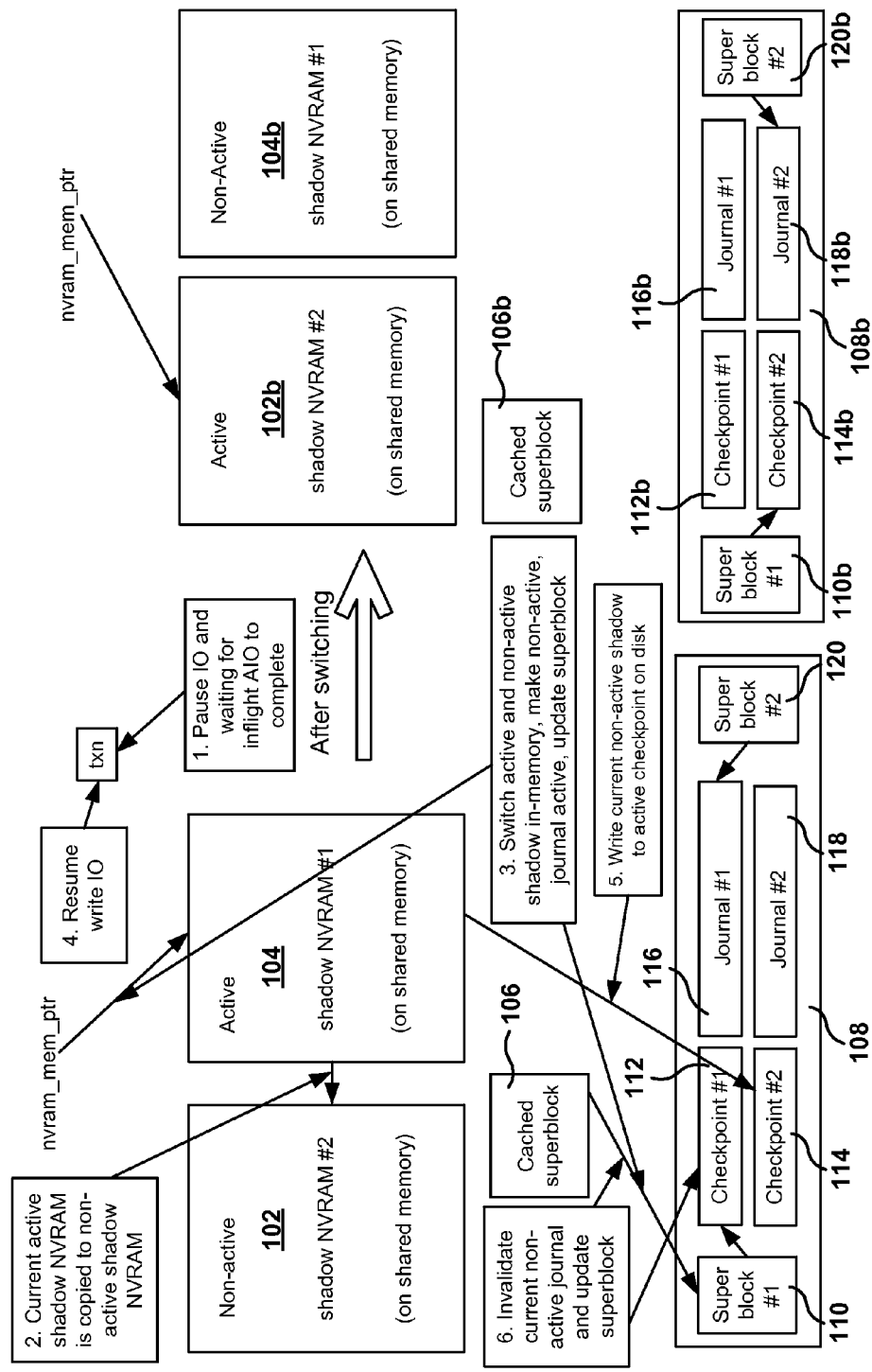
FIG. 2 illustrates the switch of the active and non-active shadow NVRAMS, according to one embodiment.

FIG. 2 illustrates the switch of the active and non-active journals, according to one embodiment. The embodiment of FIG. 2 includes active journal #1 116 and non-active journal #2 118, and active shadow NVRAM 104 and non-active shadow NVRAM 102. In one embodiment, the following operations are performed to switch the active 116 and non-active 118 journals:

1. When the currently active journal approaches being full, the write operations to the NVRAM are paused.

2. The currently active NVRAM 104 is copied to the non-active NVRAM 102.

3. The non-active shadow NVRAM 102 is marked as active 102*b* and the previously active shadow NVRAM 104 is marked as non-active 104*b* in memory. Further, the new active journal 118*b* is marked as active, the corresponding fields in the in-memory cached superblock 106 are updated, and the superblock is updated on disk.

4. After the superblocks are written to disk, write operations are resumed. From this point on, the new writes will go to the new active journal 118*b*.

5. The current non-active shadow NVRAM 104*b* is written to the active checkpoint 114*b* on disk.

6. The current non-active journal 112*b* is invalidated, the corresponding write is cleared, the offset in memory is completed, and the superblock on disk 108 is updated.

Before switching, superblocks #1 110 and #2 120 point to journal #1 116 and checkpoint #1 112. After switching, super block #1 110*b* and super block #2 120*b* point to checkpoint #2 114*b* of journal #2 118*b*.

FIG. 3A illustrates a high level representation of the format of the journal 116, according to one embodiment. Journal #1 includes superblock #1, checkpoint #1, and N record entries in the journal #1. Similarly, journal #2 includes superblock #2, checkpoint #2, and N record entries in the journal #2. Of course, as discussed above one of the journals will be active at any point in time and the other one will be non-active.

It is noted that the embodiment illustrated in FIG. 3A is exemplary. Other embodiments may utilize different amounts of space for the actual storage, depending on the sizing of the system and how much NVRAM needs to be virtualized. The embodiments illustrated in FIG. 3A should therefore not be interpreted to be exclusive or limiting, but rather exemplary or illustrative.

FIG. 3B illustrates the process for writing the journal, according to one embodiment. The journal record is written sequentially. To improve performance, asynchronous parallel writes to the journal are enabled. However, parallel writes can leave gaps in the journal when some of the writes are incomplete due to a system crash.

One simple solution is to return completion status for the writes when they are completely written to disk, and there is not gap before them. The writes after a gap can be discarded because they are considered incomplete. It is desirable to save the journal write position on disk, but that requires one extra non-sequential write. To avoid the extra write, the journal write position can be saved in shared memory. During a system restart, the system can recover the write position.

However, this doesn't work for a controller reboot when shared memory is lost. In the case of a controller reboot, the last write is found by scanning the journal from the beginning. To facilitate the search, the following fields are stored on the journal record header:

1. Magic number
2. Journal generation number. This number is incremented on each wraparound of journal.
3. Sequence number of the record
4. Length of the record
5. Checksum of the record (including header and data).

Figure 4:
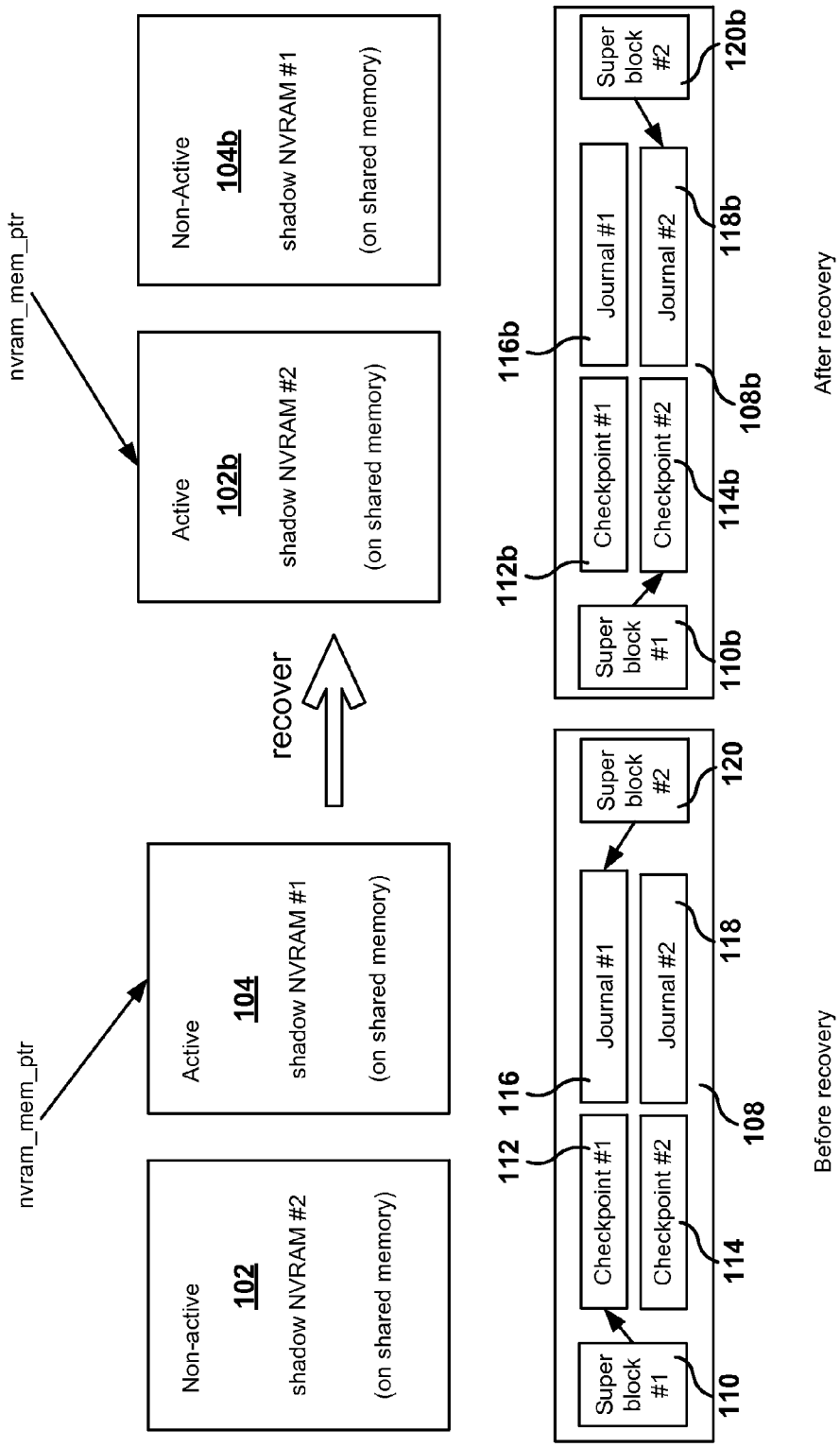
FIG. 4 illustrates the process of switching active and non-active copies of the NVRAM when the active journal is full or almost full, according to one embodiment.

FIG. 4 illustrates the process of switching active and non-active copies of the NVRAM when the active journal is full or almost full, according to one embodiment. The work flow of switching active and non-active copies when the active journal is full is as follows:

1. When the current active journal 116 approaches being full, the write operations to NVRAM are blocked. Then, a copy of the current active shadow NVRAM 104 is made to the non-active shadow NVRAM 102.
2. The non-active shadow NVRAM is labeled as active and the old active shadow NVRAM as non-active, i.e., the shadow NVRAM switch labels.
3. The new active journal 118 is marked as valid, and the super block on-disk 110 records the new active journal 118*b* is the active journal.
4. After all the markings are recorded into the super block on shared memory, writes are enabled to the new active NVRAM 102*b*.
5. The current non-active shadow NVRAM 104*b* is copied to the active persistent disk copy to make a check point.
6. The current non-active journal 116*b* is invalidated. The corresponding write and complete offset are cleared on shared memory.
7. If successful, the super block on shared memory is written to the super block on disk.

Figure 5A:
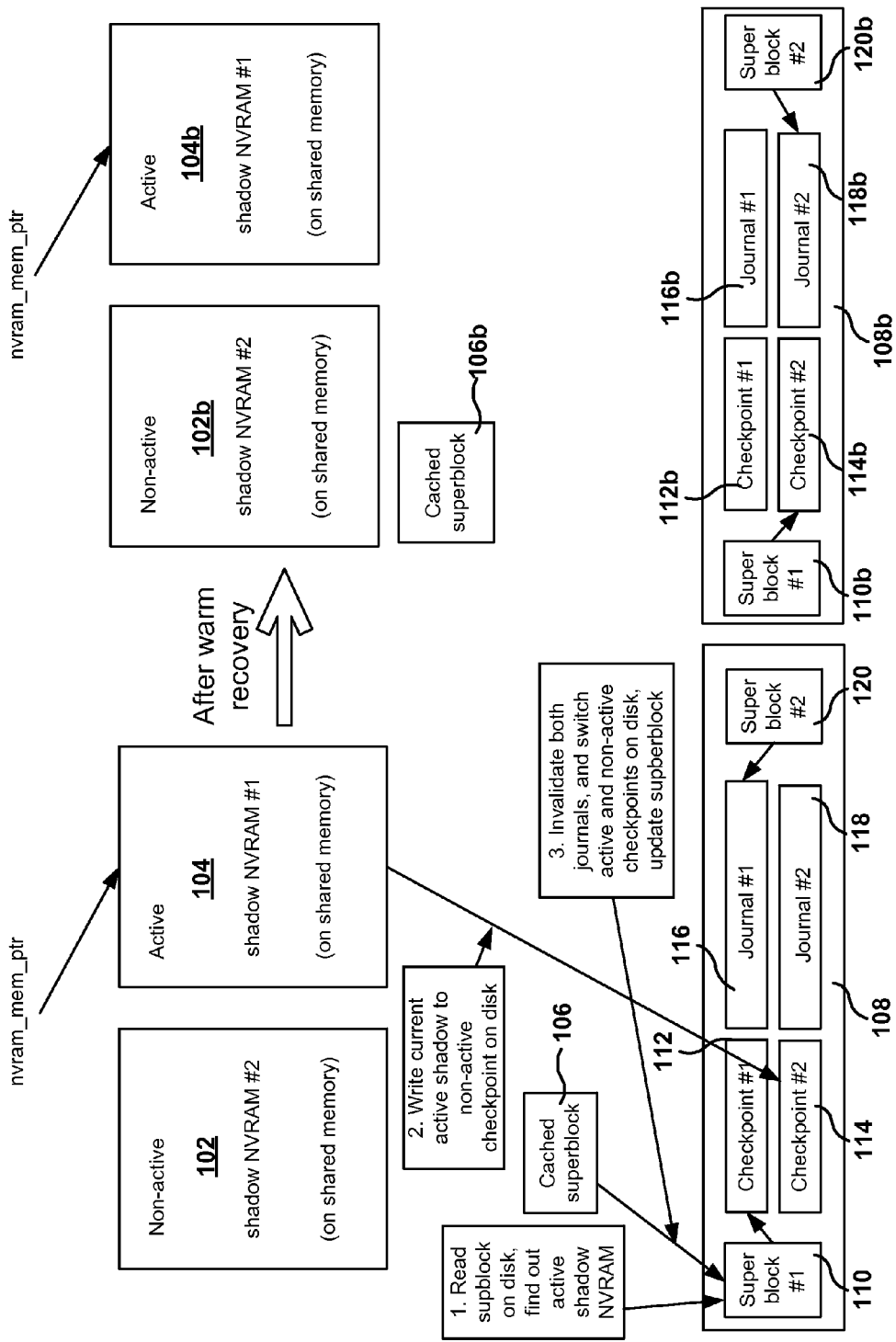
FIG. 5A illustrates the recovery process during reboot, according to one embodiment.

FIG. 5A illustrates the recovery process during reboot, according to one embodiment. A warm recovery takes place when process is restarted without doing a reboot, therefore, there is information in the shared memory that can be utilized for the recovery. This means that after a process restart, usually the active shadow NVRAM in shared memory is still valid.

The workflow of the recovery process from controller reboot is as follows:

1. The superblock 110 on disk is checked. The latest valid superblock is located and loaded into memory. Further, the superblock 110 information is used to find the latest valid checkpoint 112 and invalid checkpoint 114 on disk. Further, the journal(s) are replayed on the active shadow NVRAM 104.
2. The active shadow NVRAM 104 is copied to the kept invalid checkpoint 114 copy on the disk.
3. Both journals are invalidated and write_offset and complete_offset are reset in memory, active and non-active checkpoints (110 and 120) are switched on disk, and the superblock on disk 110*b* is updated.

Figure 5B:
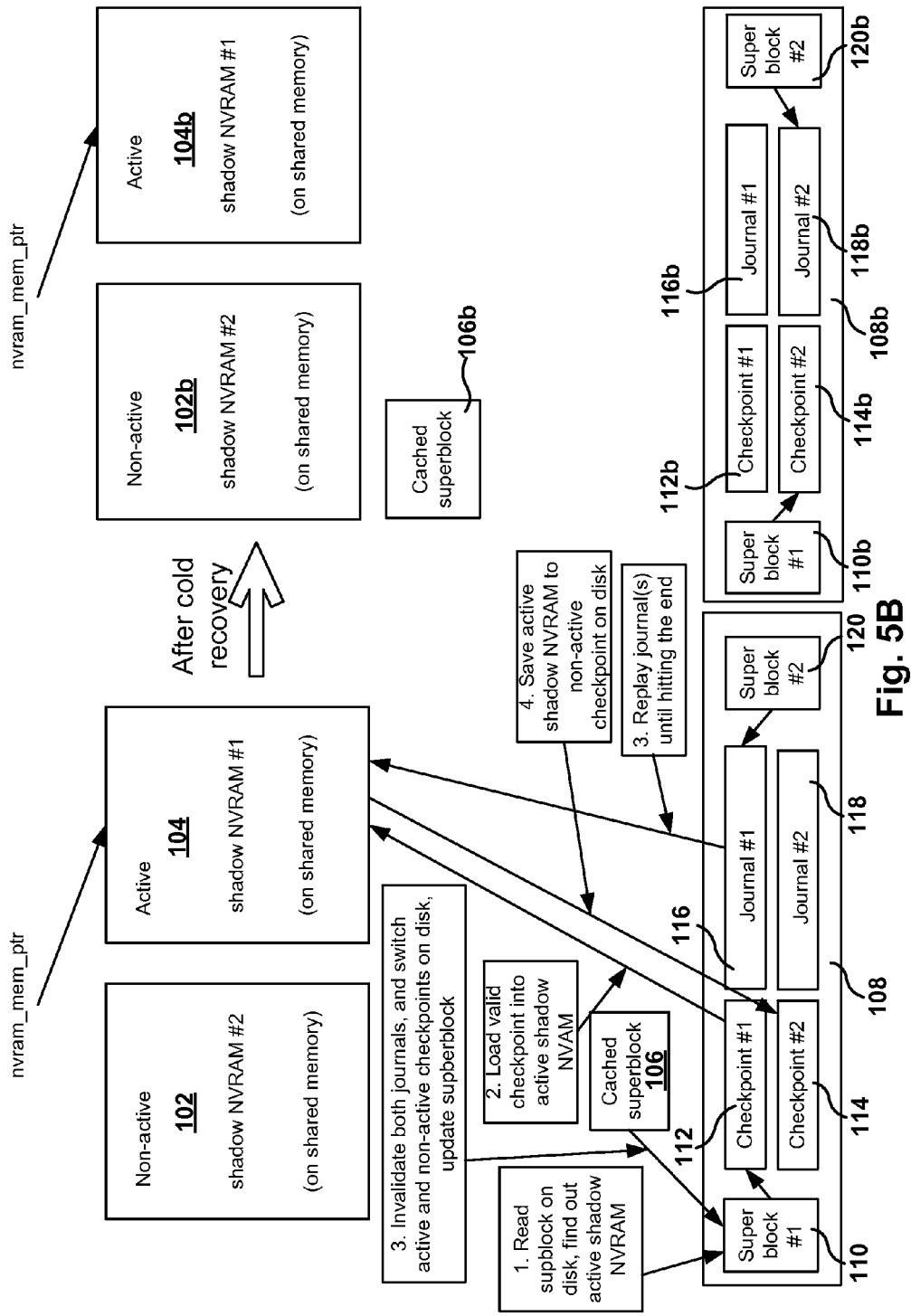
FIG. 5B illustrates the recovery process during restart, according to one embodiment.

FIG. 5B illustrates the recovery process during restart, according to one embodiment. A cold recovery follows a hardware reboot. During the cold recovery, the last NVRAM state is restored from the latest checkpoint and journals on the disk because the contents of the RAM are not considered to be valid.

The workflow for the recovery process from the system restart is as follows:

1. The superblock 110 on disk is checked to locate the latest valid superblock, which will be loaded into memory. The superblock information is used to find the latest valid and invalid checkpoints (112 and 114) on the disk.
2. The latest valid checkpoint 112 is loaded into the active shadow NVRAM 104.
3. The journal corresponding to the checkpoint is replayed until an invalid record is reached. The replay applies the recorded transactions to the active shadow NVRAM 104. If the other journal is valid, replay all the valid journal entries from the journal on the active shadow NVRAM 104.
4. The active shadow NVRAM 104 is copied to the invalid checkpoint 114 copy on disk.
5. Both journals, write_offset and complete_offset are reset/invalidated in memory. Further, the active and non-active checkpoints on disk on cached superblock are switched, and the superblock on disk is updated.

Figure 6A:
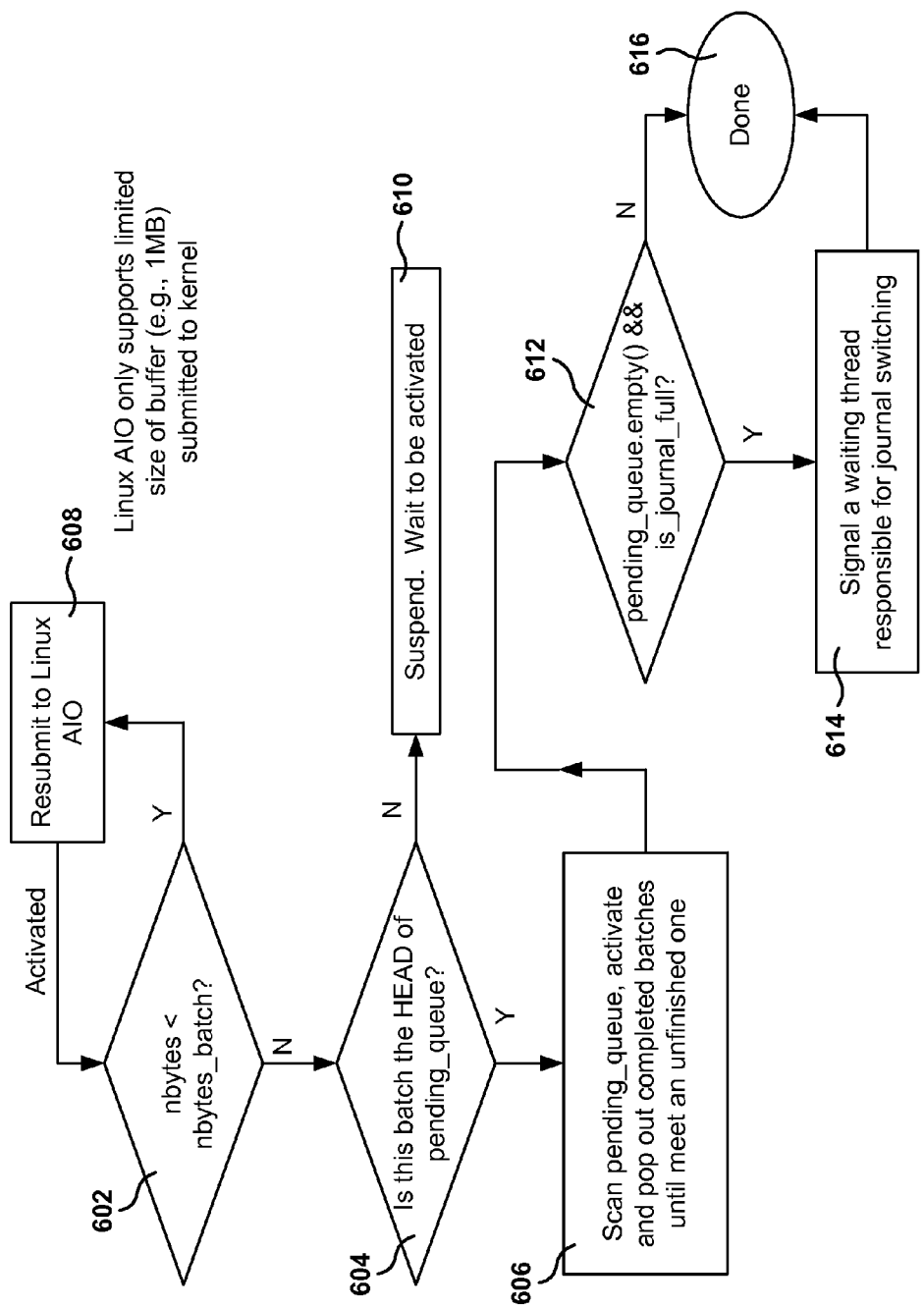
FIG. 6A is a flowchart for processing asynchronous Input/Outputs (IOs), according to one embodiment.

FIG. 6A is a flowchart for processing asynchronous IOs, according to one embodiment. FIG. 6A illustrates the events request after an AIO finishes. While the various operations in this flowchart are presented and described sequentially, one of ordinary skill will appreciate that some or all of the operations may be executed in a different order, be combined or omitted, or be executed in parallel.

In operation 602, a check is made to determine if nbytes<nbytes_batch. If nbytes<nbytes_batch then, in operation 608, the AIO is resubmitted to the guest OS. Otherwise, the method flows to operation 604, where a check is made to determine if this batch is the head of pending_queue. If the check is positive, the method flows to operation 606, otherwise the method flows to operation 610, where the process is suspended away is started until the process is reactivated.

In operation 606, the pending_queue is scanned, and the completed batches are activated and popped out until an unfinished one is found. From operation 606, the method flows to operation 612, where a check is made to determine if pending_queue is empty and the journal is full. If the check is positive, the method flows to operation 614, otherwise the method flows to operation 616. In operation 614, awaiting thread responsible for the journal switching is signaled.

Figure 6B:
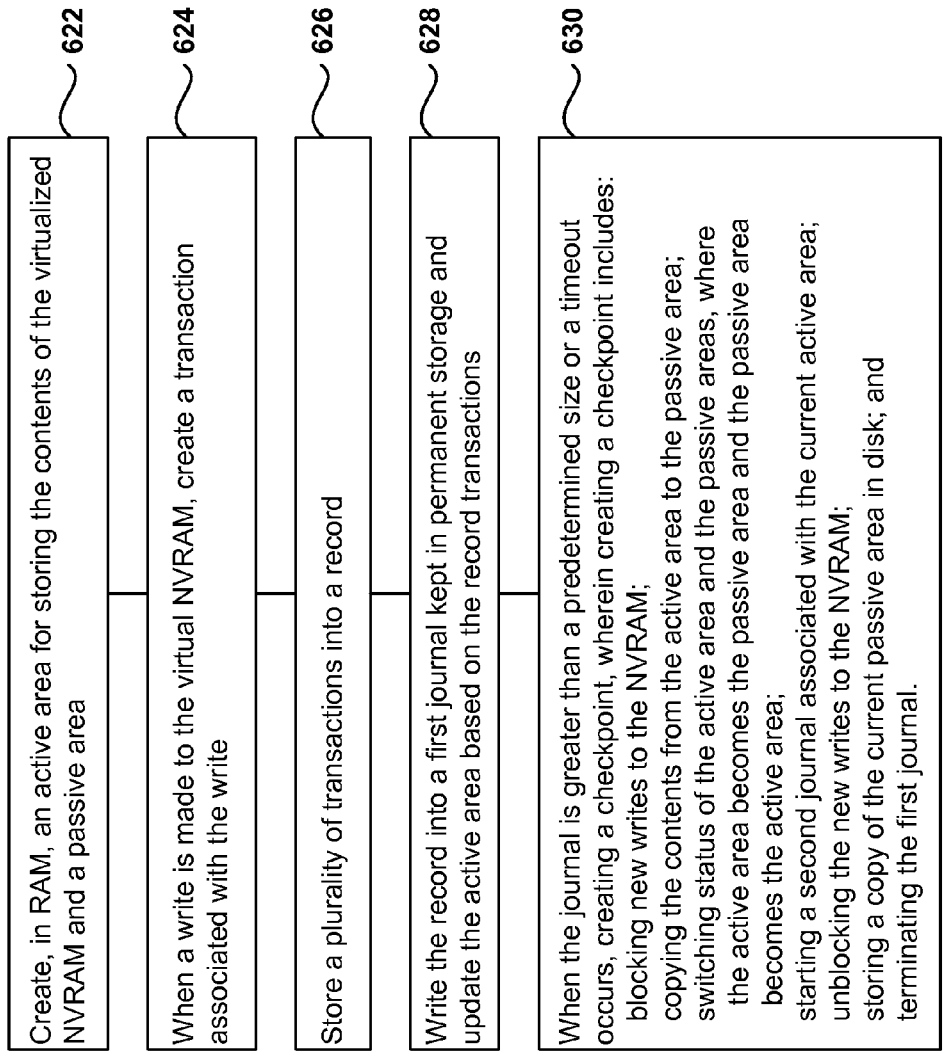
FIG. 6B is a flowchart for virtualizing NVRAM, according to one embodiment.

FIG. 6B is a flowchart for virtualizing NVRAM, according to one embodiment. While the various operations in this flowchart are presented and described sequentially, one of ordinary skill will appreciate that some or all of the operations may be executed in a different order, be combined or omitted, or be executed in parallel.

In operation 622, two areas are created in RAM, an active area for storing the contents of the virtualized NVRAM, and a non-active area. From operation 622, the method flows to operation 624, where when a write is made to the virtual NVRAM, the system stores the write in the active area, and the system creates a transaction associated with the write.

From operation 624, the method flows to operation 626 where a plurality of transactions is stored into a record. From operation 626, the method flows to operation 628, where the record is written into a first journal that is kept in permanent storage. Further, the record is reflected into the active area (e.g., the transactions in the record are reflected into the active area).

From operation 628, the method flows to operation 630, and when the journal is greater than a predetermined size or a timeout occurs, a checkpoint is created. Creating a checkpoint includes the following operations:

blocking new writes to the NVRAM;
copying the contents from the active area to the non-active area;
switching status of the active area and the non-active areas, where the active area becomes the non-active area and the non-active area becomes the active area;
starting a second journal associated with the current active area;
unblocking the new writes to the NVRAM;
storing a copy of the current non-active area on disk; and
terminating the first journal.

Figure 7A:
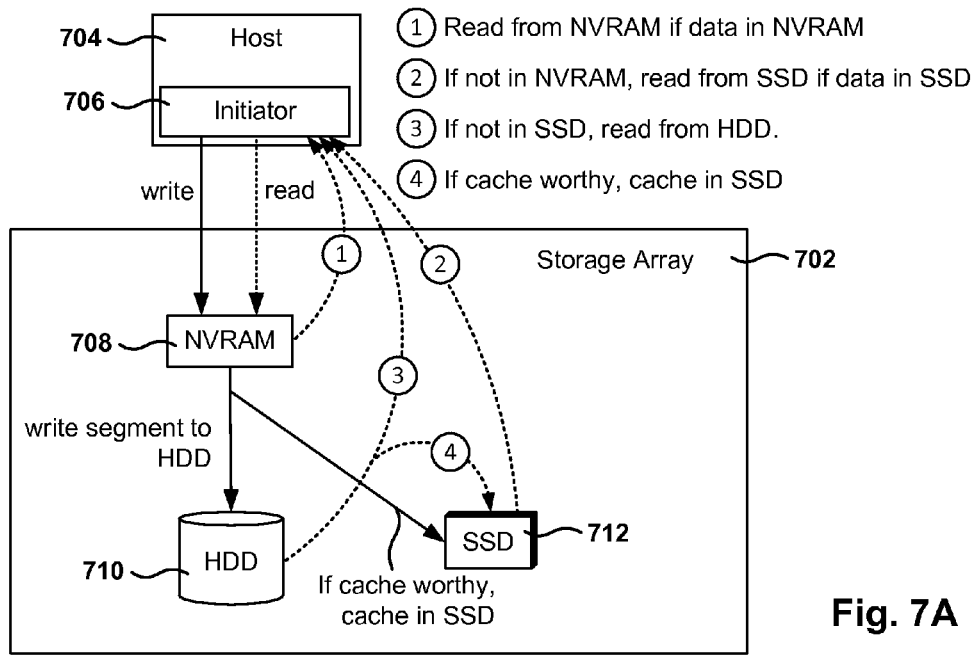
FIGS. 7A-7B illustrate the read and write paths within the storage array, according to several embodiments.
Figure 7B:
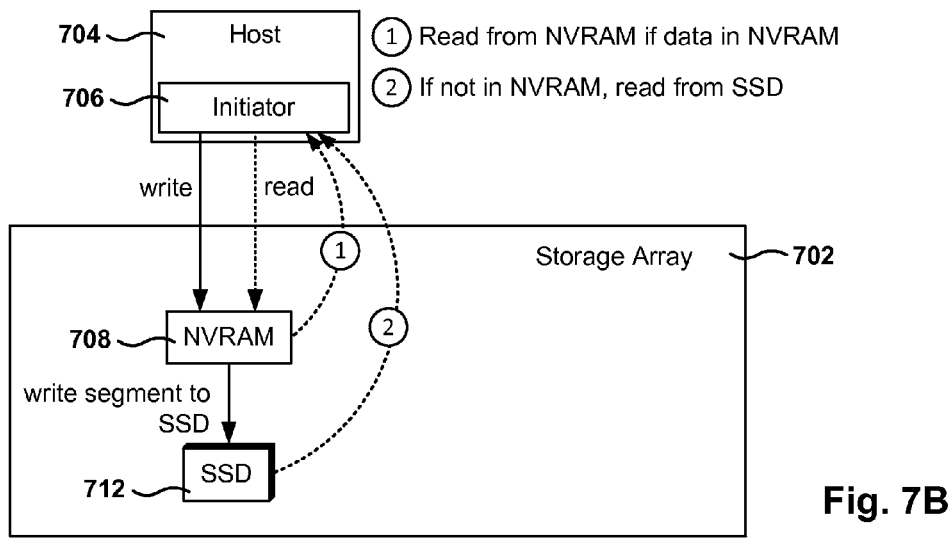

FIGS. 7A-7B illustrate the read and write paths within the storage array, according to several embodiments. FIG. 7A shows the write path for a hybrid system with SSDs and HDDs, where the initiator 706 in the host 704 sends the write request to the network storage device, also referred to herein as storage array 702. As the write data comes in, the write data is written into NVRAM 708, and an acknowledgment is sent back to the initiator (e.g., the host or application making the request). In one embodiment, storage array 702 supports variable block sizes. Data blocks in the NVRAM 708 are grouped together to form a segment that includes a plurality of data blocks, which may be of different sizes. The segment is compressed and then written to HDD 710. In addition, if the segment is considered to be cache-worthy (i.e., important enough to be cached or likely to be accessed again) the segment is also written to the solid state drive (SSD) cache 712. In one embodiment, the segment is written to the SSD 712 in parallel while writing the segment to HDD 710.

In one embodiment, the performance of the write path is driven by the flushing of NVRAM 708 to disk 710. With regards to the read path, the initiator 706 sends a read request to storage array 702. The requested data may be found in any of the different levels of storage mediums of the storage array 702. First, a check is made to see if the data is found in RAM (not shown), which is a shadow memory of NVRAM 708, and if the data is found in RAM then the data is read from RAM and sent back to the initiator 706. In one embodiment, the shadow RAM memory (e.g., DRAM) keeps a copy of the data in the NVRAM and the read operations are served from the shadow RAM memory. When data is written to the NVRAM, the data is also written to the shadow RAM so the read operations can be served from the shadow RAM leaving the NVRAM free for processing write operations.

If the data is not found in the shadow RAM then a check is made to determine if the data is in cache, and if so (i.e., cache hit), the data is read from the flash cache 712 and sent to the initiator 706. If the data is not found in the NVRAM 708 nor in the flash cache 712, then the data is read from the hard drives 710 and sent to the initiator 706. In addition, if the data being served from hard disk 710 is cache worthy, then the data is also cached in the SSD cache 712.

FIG. 7B illustrates the read and write paths for an all-flash array having SSDs for permanent storage and no HDDs. The write path includes writing the incoming data to NVRAM 708 and later saving the data in SSD 712. The read path is also simplified as compared to the hybrid system of FIG. 7A, where the data is read from NVRAM 708 if available in NVRAM, and if the data is not found in NVRAM 708 then the data is read from SSD 712.

Figure 8:
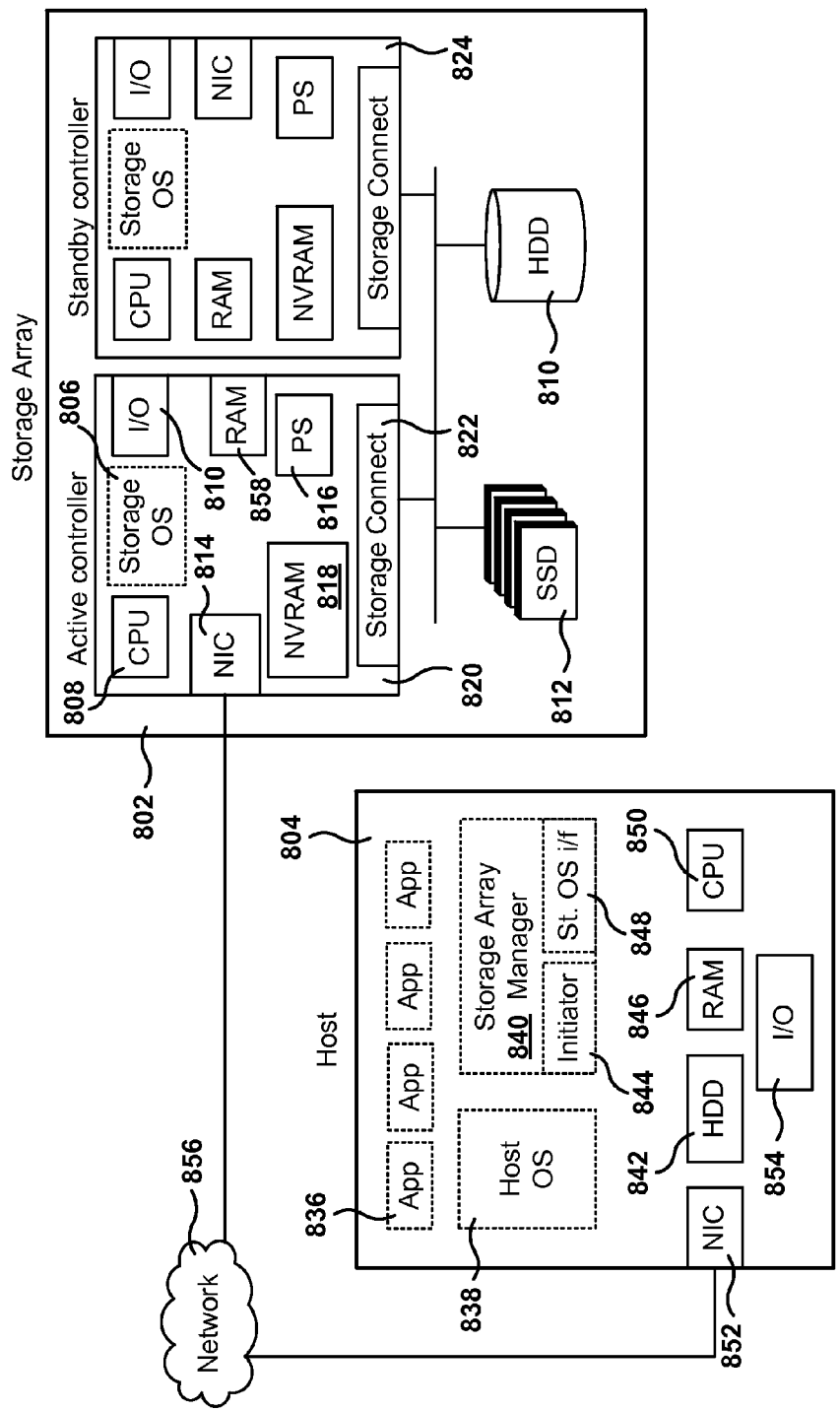
FIG. 8 illustrates the architecture of a storage array, according to one embodiment.

FIG. 8 illustrates the architecture of a storage array, according to one embodiment. In one embodiment, the storage array 802 includes an active controller 820, a standby controller 824, one or more SSDs 712, and disk storage 710. In one embodiment, the controller 820 includes non-volatile RAM (NVRAM) 818, which is for storing the incoming data as the data arrives to the storage array. After the data is processed (e.g., compressed and organized in segments (e.g., coalesced)), the data is transferred from the NVRAM 818 to HDD 710 and optionally to SSD 712.

In addition, the active controller 820 further includes CPU 808, general-purpose RAM 858 (e.g., used by the programs executing in CPU 808), input/output module 810 for communicating with external devices (e.g., USB port, terminal port, connectors, plugs, links, etc.), one or more network interface cards (NICs) 814 for exchanging data packages through network 856, one or more power supplies 816, a temperature sensor (not shown), and a storage connect module 822 for sending and receiving data to and from SSD 712. In one embodiment, standby controller 824 includes the same components as active controller 820.

Active controller 820 is configured to execute one or more computer programs stored in RAM 858. One of the computer programs is the storage operating system (OS) used to perform operating system functions for the active controller device. In some implementations, one or more expansion shelves may be coupled to storage array 802 to increase storage capacity.

Active controller 820 and standby controller 824 have their own NVRAMs, but they share SSDs 712. The standby controller 824 receives copies of what gets stored in the NVRAM 818 of the active controller 820 and stores the copies in its own NVRAM. If the active controller 820 fails, standby controller 824 takes over the management of the storage array 802. When servers, also referred to herein as hosts, connect to the storage array 802, read/write requests (e.g., IO requests) are sent over network 856, and the storage array 802 stores the sent data or sends back the requested data to host 804.

Host 804 is a computing device including a CPU 850, memory (RAM) 846, permanent storage (HDD) 842, a NIC card 852, and an IO module 854. The host 804 includes one or more applications 836 executing on CPU 850, a host operating system 838, and a computer program storage array manager 840 that provides an interface for accessing storage array 802 to applications 836. Storage array manager 840 includes an initiator 844 and a storage OS interface program 848. When an IO operation is requested by one of the applications 836, the initiator 844 establishes a connection with storage array 802 in one of the supported formats (e.g., iSCSI, Fibre Channel, or any other protocol). The storage OS interface 848 provides console capabilities for managing the storage array 802 by communicating with the active controller 820 and the storage OS 806 executing therein.

To process the IO requests, resources from the storage array 802 are required. Some of these resources may be a bottleneck in the processing of storage requests because the resources are over utilized, or are slow, or for any other reason. In general, the CPU and the hard drives of the storage array 802 can become over utilized and become performance bottlenecks. For example, the CPU may become very busy because the CPU is utilized for processing storage IO requests while also performing background tasks, such as garbage collection, snapshots, replication, alert reporting, etc. In one example, if there are many cache hits (i.e., the SSD contains the requested data during IO requests), the SSD cache, which is a fast responding system, may press the CPU for cycles, thus causing potential bottlenecks for other requested IOs or for processing background operations.

For purposes of discussion and understanding, reference is made to CASL as being an algorithm processed by the storage OS. However, it should be understood that optimizations, modifications, additions, and subtractions to versions of CASL may take place from time to time. As such, reference to CASL should be understood to represent exemplary functionality, and the functionality may change from time to time, and may be modified to include or exclude features referenced herein or incorporated by reference herein. Still further, it should be understood that the embodiments described herein are just examples, and many more examples and/or implementations may be defined by combining elements and/or omitting elements described with reference to the claimed features.

In one embodiment, it should be understood that the "block level processing" of SSDs 712 is different than "instruction level processing," which is a common function in microprocessor environments. In one example, microprocessor environments utilize main memory, and various levels of cache memory (e.g., L1, L2, etc.). Instruction level caching, is differentiated further, because instruction level caching is block-agnostic, meaning that instruction level caching is not aware of what type of application is producing or requesting the data processed by the microprocessor. Generally speaking, the microprocessor is required to treat all instruction level caching equally, without discriminating or differentiating processing of different types of applications.

One or more embodiments can also be fabricated as computer readable code on a non-transitory computer readable storage medium. The non-transitory computer readable storage medium is any non-transitory data storage device that can store data, which can be read later by a computer system. Examples of the non-transitory computer readable storage medium include hard drives, network attached storage (NAS), read-only memory, random-access memory, CD-ROMs, CD-Rs, CD-RWs, magnetic tapes, and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the described embodiments.

What is claimed is:

1. A method comprising:
    labeling a first area in Random Access Memory (RAM) as an active area of a virtual non-volatile RAM (NVRAM) and a second area in RAM as a non-active area of the virtual NVRAM;
    creating, in permanent storage, a first journal and a second journal, wherein the first journal is an active journal associated with the first area labeled as the active area and the second journal is a non-active journal associated with the second area labeled as the non-active area;
    creating a transaction for each write made to the virtual NVRAM;
    writing the created transactions to the active journal and to the active area; and
    based on a size of the active journal exceeding a predetermined threshold, creating a checkpoint, wherein creating the checkpoint includes:
        copying contents from the active area to the non-active area;
        switching status of the active area and the non-active area, wherein the first area becomes the non-active area and the second area becomes the active area to store writes made to the virtual NVRAM;
        switching status of the active journal and the non-active journal, wherein the first journal becomes the non-active journal and the second journal becomes the active journal; and
        copying contents of the currently non-first area to permanent storage as the checkpoint, wherein the checkpoint is a last state of the virtual NVRAM from which to begin recovery.

2. The method as recited in claim 1, wherein writing the created transactions to the active journal and to the active area includes:
    storing a plurality of transactions into a record;
    writing the record into the active journal; and
    updating contents of the active area based on the record written to the active journal.

3. The method as recited in claim 1, wherein creating the checkpoint further includes:
    before copying contents from the active area, blocking new writes to the virtual NVRAM;
    after switching status of the active journal and the non-active journal, unblocking the new writes to the virtual NVRAM; and
    resetting the current non-active journal.

4. The method as recited in claim 1, wherein switching status of the active journal and the non-active journal further includes:
    initializing the currently active journal.

5. The method as recited in claim 1, further comprising keeping information on the currently active journal in a first superblock in permanent storage.

6. The method as recited in claim 5, further including:
    after a warm recovery of a system hosting the virtual NVRAM:
        reading the first superblock to identify the currently active area and the currently non-active area;

writing the currently active area to a non-active checkpoint on permanent storage; and
switching active and non-active checkpoints on permanent storage.

7. The method as recited in claim 5, further including:
after a cold recovery of a system hosting the virtual NVRAM:
reading the first superblock to identify the currently active area and the currently non-active area;
loading a valid checkpoint into the currently active area;
replaying records on the active journal to be loaded into the currently active area; and
saving the currently non-active area to a non-active checkpoint on permanent storage.

8. A system for virtualizing Non-Volatile Random Access Memory (NVRAM), the system comprising:
a processor;
a Random Access Memory (RAM), wherein the processor labels a first area in the RAM as an active area of a virtual NVRAM and a second area in the RAM as a non-active area of the virtual NVRAM; and
a permanent storage storing a first journal and a second journal, wherein the first journal is an active journal associated with the first area labeled as the active area and the second journal is a non-active journal associated with the second area labeled as the non-active area, wherein the processor creates a transaction for each write made to the virtual NVRAM and the processor writes the created transactions to the active journal and to the active area;
wherein, based on a size of remaining space on the active journal falling below a predetermined threshold, the processor creates a checkpoint in the permanent storage, wherein, to create the checkpoint, the processor is to:
copy contents from the active area to the non-active area;
switch status of the active area and the non-active area, wherein the first area becomes the non-active area and the second area becomes the active area to store writes made to the virtual NVRAM;
switch status of the active journal and the non-active journal, wherein the first journal becomes the non-active journal and the second journal becomes the active journal; and
copy contents of the currently non-first area to permanent storage as the checkpoint, wherein the checkpoint is a last state of the virtual NVRAM from which to begin recovery.

9. The system as recited in claim 8, wherein when writing the created transactions to the active journal and to the active area, the processor stores a plurality of transactions into a record, writes the record into the active journal, and updates contents of the active area based on the record written to the active journal.

10. The system as recited in claim 8, wherein, to create the checkpoint, the processor, before copying contents from the active area, is to block new writes to the virtual NVRAM, wherein after switching status of the active journal and the non-active journal, the processor is to unblock the new writes to the virtual NVRAM; and to reset the current non-active journal.

11. The system as recited in claim 8, wherein when switching status of the active journal and the non-active journal the processor is to initialize the currently active journal.

12. The system as recited in claim 8, wherein the processor is to keep information on the currently active journal in a first superblock in the permanent storage.

13. The system as recited in claim 12, wherein after a warm recovery of a system hosting the virtual NVRAM, the processor is to read the first superblock to identify the currently active area and the currently non-active area, to write the currently active area to a non-active checkpoint on the permanent storage, and to switch active and non-active checkpoints on the permanent storage.

14. The system as recited in claim 12, wherein after a cold recovery of a system hosting the virtual NVRAM, the processor is to read the first superblock to identify the currently active area and the currently non-active area, to load a valid checkpoint into the currently active area, to replay records on the active journal to be loaded into the currently active area, and to save the non-active area to a non-active checkpoint on the permanent storage.

15. A non-transitory computer-readable storage medium storing a computer program for virtualizing Non-Volatile Random Access Memory (NVRAM), wherein the program, when executed by a processor, is to cause the processor to:
label a first area in Random Access Memory (RAM) as an active area of a virtual NVRAM and a second area in RAM as a non-active area of the virtual NVRAM;
create, in permanent storage, a first journal and a second journal, wherein the first journal is an active journal associated with the first area labeled as the active area and the second journal is a non-active journal associated with the second area labeled as the non-active area;
create a transaction for each write made to the virtual NVRAM;
write the created transactions to the active journal and to the active area; and
based on a size of the active journal being greater than a predetermined size or a timeout occurring, create a checkpoint, wherein creating a checkpoint includes:
copying contents from the active area to the non-active area;
switching status of the active area and the non-active area, wherein the first area becomes the non-active area and the second area becomes the active area to store writes made to the virtual NVRAM;
switching status of the active journal and the non-active journal, wherein the first journal becomes the non-active journal and the second journal becomes the active journal; and
copying contents of the currently non-first area to permanent storage as the checkpoint, wherein the checkpoint is a last state of the virtual NVRAM from which to begin recovery.

16. The storage medium as recited in claim 15, wherein, to write the created transactions to the active journal and to the active area, the program is further to cause the processor to:
store a plurality of transactions into a record;
write the record into the active journal; and
update contents of the active area based on the record written to the active journal.

17. The storage medium as recited in claim 15, wherein, to create the checkpoint, the program is further to cause the processor to:
before copying contents from the active area, block new writes to the virtual NVRAM;

after switching status of the active journal and the non-active journal, unblock the new writes to the virtual NVRAM; and reset the current non-active journal.

18. The storage medium as recited in claim 15, wherein, to switch status of the active journal and the non-active journal, the program is further to cause the processor to:

initialize the current active journal.

19. The storage medium as recited in claim 15, wherein the instructions are further to cause the processor to keep information on the currently active journal in a first superblock in permanent storage.

20. The storage medium as recited in claim 19, wherein the instructions are further to cause the processor to:

after a warm recovery of a system hosting the virtual NVRAM, read the first superblock to identify the currently active area and the currently non-active area;

write the currently active area to a non-active checkpoint on permanent storage; and switch active and non-active checkpoints on permanent storage.

\* \* \* \* \*